(12) United States Patent
Jessen (10) Patent No.: US 11,712,041 B2
(45) Date of Patent: Aug. 1, 2023

(54) SEAFOOD SHELLER

(71) Applicant: CRABKEY INC., Seattle, WA (US)

(72) Inventor: John W. Jessen, Shoreline, WA (US)

(73) Assignee: CrabKey Inc., Seattle, WA (US)

( * ) Notice: Subject to any disclaimer, the term of this patent is extended or adjusted under 35 U.S.C. 154(b) by 184 days.

(21) Appl. No.: 17/420,872

(22) PCT Filed: Jan. 8, 2020

(86) PCT No.: PCT/US2020/012811
§ 371 (c)(1),
(2) Date: Jul. 6, 2021

(87) PCT Pub. No.: WO2020/146550
PCT Pub. Date: Jul. 16, 2020

(65) Prior Publication Data
US 2022/0061341 A1    Mar. 3, 2022

Related U.S. Application Data (60) Provisional application No. 62/791,728, filed on Jan. 11, 2019.

(51) Int. Cl.
*A22C 29/00*    (2006.01)
*A22C 29/02*    (2006.01)

(52) U.S. Cl.
CPC ................... *A22C 29/027* (2013.01)

(58) Field of Classification Search
CPC .. A47G 21/065; A22C 29/027; A22C 29/025; A22C 29/024; A22C 29/026; A22C 29/04; A22C 29/046
See application file for complete search history.

(56) References Cited

U.S. PATENT DOCUMENTS 4,569,103 A * 2/1986 Taurinskas ........... A22C 29/024
452/6
4,610,052 A    9/1986 Lubcke
(Continued)

FOREIGN PATENT DOCUMENTS

| CN | 201439203 U | 4/2010 |
| DE | 202012008980 U1 | 1/2013 |
| KR | 20110000983 U | 1/2011 |

OTHER PUBLICATIONS

"International Search Report and Written Opinion Issued in PCT Application No. PCT/US2020/012811", dated Mar. 31, 2020, 14 Pages.

*Primary Examiner* — Richard T Price, Jr.
(74) *Attorney, Agent, or Firm* — AEON Law, PLLC; Adam L. K. Philipp; James J. Namiki (57) ABSTRACT

A seafood sheller for cracking or cutting open shells of, for example, crustaceans is described herein. The seafood sheller having a handle member, an upper beak member and a lower bladed member. The upper beak member extending longitudinally forward from the handle member and having a distal end opposite from the handle member and an upper beak member bottom that extends longitudinally from the handle member. The lower blade member having a blade edge and a blade base, the blade edge extending longitudinally forward beneath the upper beak member bottom from the blade base. The blade base being connected to the upper beak member at a rearward portion of the upper beak member bottom. The lower blade member further having a distal end opposite from the blade base, the distal end of the upper beak member longitudinally extending forwardly beyond the distal end of the lower blade member.

14 Claims, 12 Drawing Sheets

(56) References Cited

U.S. PATENT DOCUMENTS

| | | | | |
|---|---|---|---|---|
| 4,610,652 | A * | 9/1986 | Henn | B65H 45/163 493/425 |
| 5,403,230 | A * | 4/1995 | Cariglione, Sr. | A22C 29/024 452/1 |
| 5,613,904 | A * | 3/1997 | LaSalle | A22C 29/024 452/6 |
| 7,024,777 | B1 * | 4/2006 | Bach | A47G 21/061 30/147 |
| 9,888,698 | B1 * | 2/2018 | Morsell | A22C 29/027 |
| 2003/0134585 | A1 | 7/2003 | Maloni | |
| 2006/0099896 | A1 * | 5/2006 | Mindes | A22C 29/024 452/3 |
| 2006/0143927 | A1 * | 7/2006 | Bach | A47G 21/061 30/147 |
| 2008/0229586 | A1 | 9/2008 | Knepfle et al. | |
| 2018/0255795 | A1 * | 9/2018 | Morsell | A22C 29/046 |

\* cited by examiner

FIG. 16

SEAFOOD SHELLER

CROSS REFERENCE TO RELATED APPLICATION(S)

This application claims priority to U.S. Provisional Patent Application Ser. No. 62/791,728, filed on Jan. 11, 2019, which is incorporated herein by reference in its entirety.

BACKGROUND

1. Technical Field

The present disclosure relates generally to a dining utensil, and more particularly, to an apparatus for cutting open the hard-shell of a crustacean such as a crab or lobster.

2. Related Art

Over the last several decades, worldwide demand for seafood has exploded. Crustaceans, such as crabs, lobsters, crayfish, prawns, and so forth, have become particularly popular delicacies enjoyed by millions. One problem faced by consumers of such delicacies is that because these crustaceans have a hard-outer shell (or simply "shells"), it can be a challenge to extract the succulent meat of the crustaceans from their outer shell.

In addition to the classic styles of nutcrackers, a number of shell-opener devices have been developed over the years for cracking open shells of crustaceans such as crabs. For example, one type of shell-opener devices are devices that resemble scissors (hereinafter "scissor-type openers"), an example of a scissor-type opener may be found, for example, in U.S. Pat. No. 6,019,673. Another type of shell-openers are devices that resemble pliers (hereinafter "plier-type openers"), an example of a plier-type opener may be found, for example, in U.S. Pat. No. 7,112,129. Yet another type of shell-openers are devices that resemble a two-prong fork (hereinafter "prong-type openers"), an example of a prong-type opener may be found, for example, in U.S. Pat. No. 8,662,966.

For various reasons, all of these shell-opener devices have deficiencies that may make them less than ideal solutions for cracking open shells of crustaceans. For example, one problem faced by plier-type openers and prong-type openers is that they can be highly ineffective in opening shells, particularly when the shell to be cracked open is not brittle, and instead, is somewhat flexible or pliable. Another problem faced by these devices is that they tend to tear apart and damage the meat to be extracted when these devices are used to split open the crustacean shells.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials of construction have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

According to various embodiments of the present disclosure, dining utensils in the form of seafood shellers are provided for opening the shells of, for example, crustaceans such as crabs and lobsters. For these embodiments, the seafood shellers may be highly durable, safe to use, simple to manufacture, able to efficiently split open shells of crustaceans even when the shells are not brittle, and able to split open the shells without significantly damaging the underlying crustacean meat.

Figure 1A:
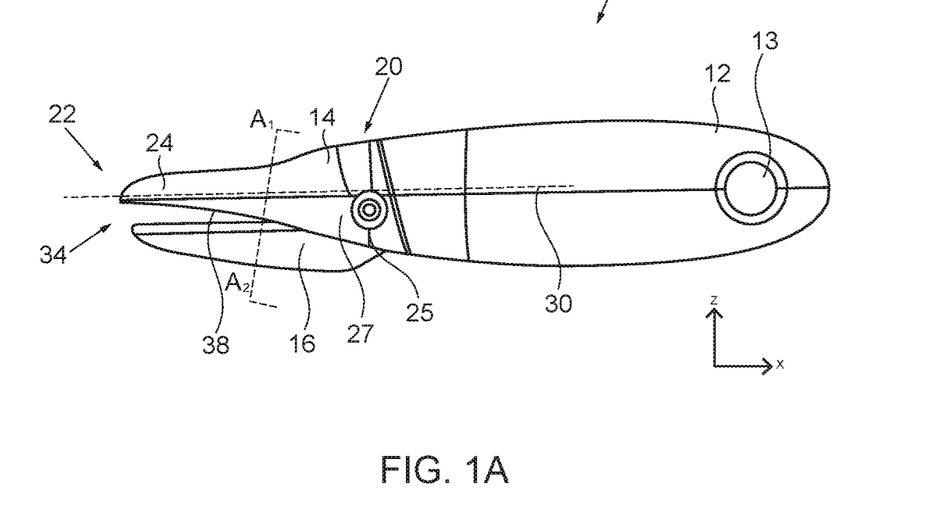
FIG. 1A is a side elevation view of an example seafood sheller according to various embodiments.
Figure 1B:
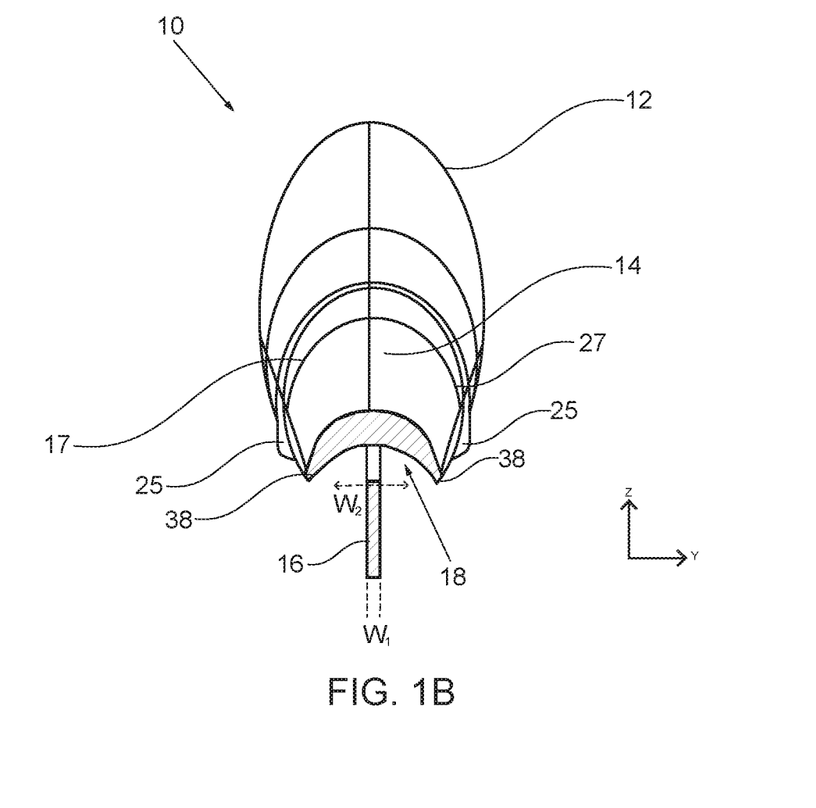
FIG. 1B is a front cross-sectional view of the example seafood sheller of FIG. 1A.

FIG. 1A illustrates a side elevation view of a seafood sheller 10, while FIG. 1B is a front cross-sectional view along broken line $A_1$-$A_2$ of the seafood sheller 10 of FIG. 1A according to an embodiment of the present disclosure. For the embodiment, the seafood sheller 10 includes a handle member 12, an upper beak member 14 that longitudinally extends from the elongated handle member 12, and a lower blade member 16 that is mounted along a channel 18 (see, for example, FIG. 1B) that is disposed at least partly longitudinally along bottom of the upper beak member 14, hereinafter "upper beak member bottom 32"—see FIG. 1C. As shown, the upper beak member 14 includes a proximal (rearward) side 20 and a distal (forward) side 22 opposite of the proximal side 20 where the proximal side 20 is connected to the handle member 12. A beak end 24 is disposed at end of the distal side 22 of the upper beak member 14. As will be further illustrated in FIGS. 1, 2, and 4, for example, the upper beak member 14 may be tapered to narrow (e.g., in terms of lateral width and height) as it extends forward from the handle member 12. In various embodiments, a through hole 13 may be present in the handle member 12 that may be used to, for example, hang the seafood sheller 10.

Note that for purposes of the following description, references may be made to directional terms such as lateral or lateral width, height, top-side, bottom-side, longitudinal, proximal, distal, and the like, with respect to the seafood shellers (e.g., seafood shellers 10 and 110) to be described herein. In order to provide proper perspective with respect to these terms, certain figures such as FIGS. 1A and 1B will be provided with x-y-z coordinates. For example, in FIG. 1A, the x-coordinate represents longitudinal directions (e.g., proximal or distal directions) with respect to the seafood sheller 10, the z-coordinate represents top and bottom directions (e.g., height) with respect to the seafood sheller 10, and the y-coordinate in FIG. 1B represents lateral directions (or lateral width) with respect to the seafood sheller 10.

Figure 6:
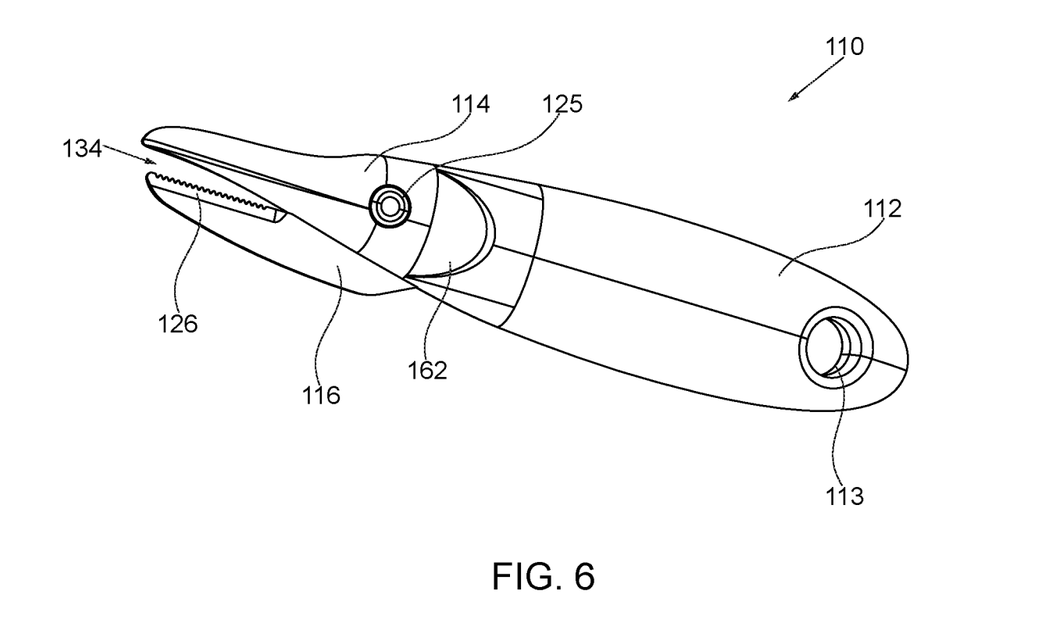
FIG. 6 is a side perspective view of another example seafood sheller according to various embodiments.
Figure 7:
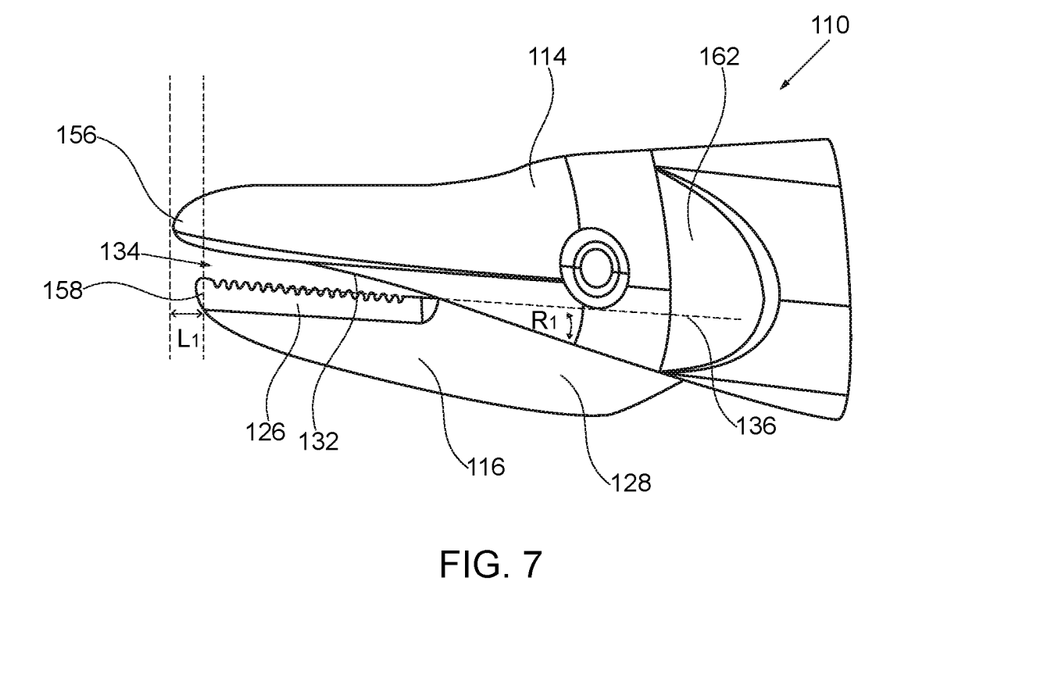
FIG. 7 is a closeup side elevation view of distal portion of the example seafood sheller of FIG. 6.
Figure 8:
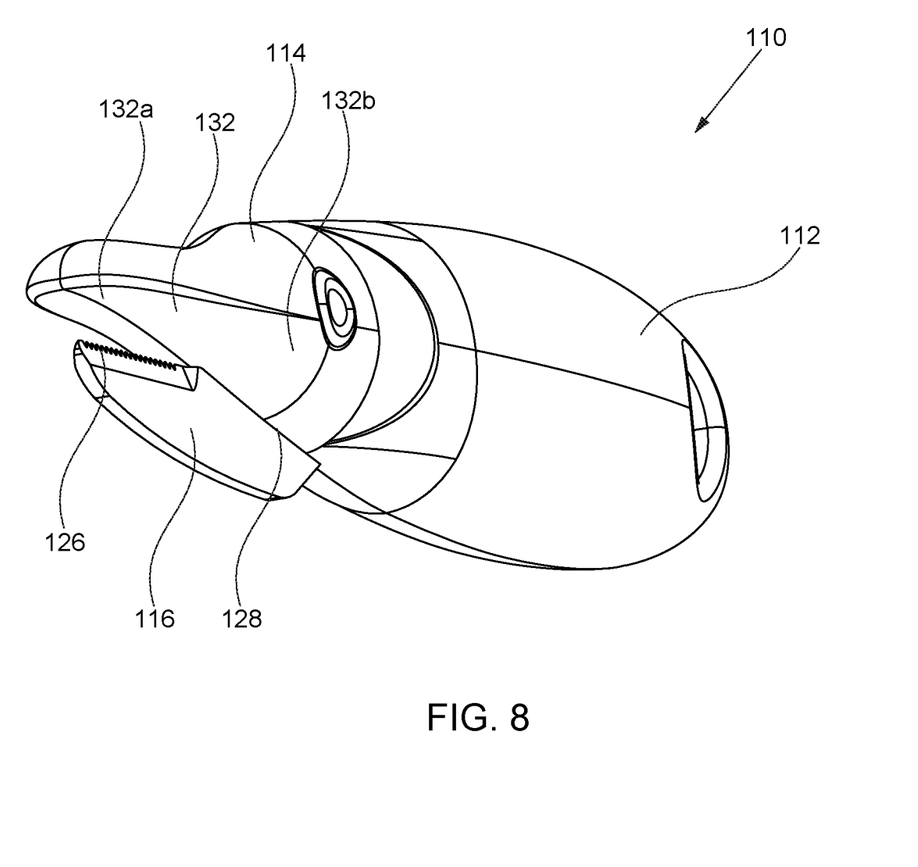
FIG. 8 is a front bottom side perspective view of the example seafood sheller of FIG. 6.
Figure 9:
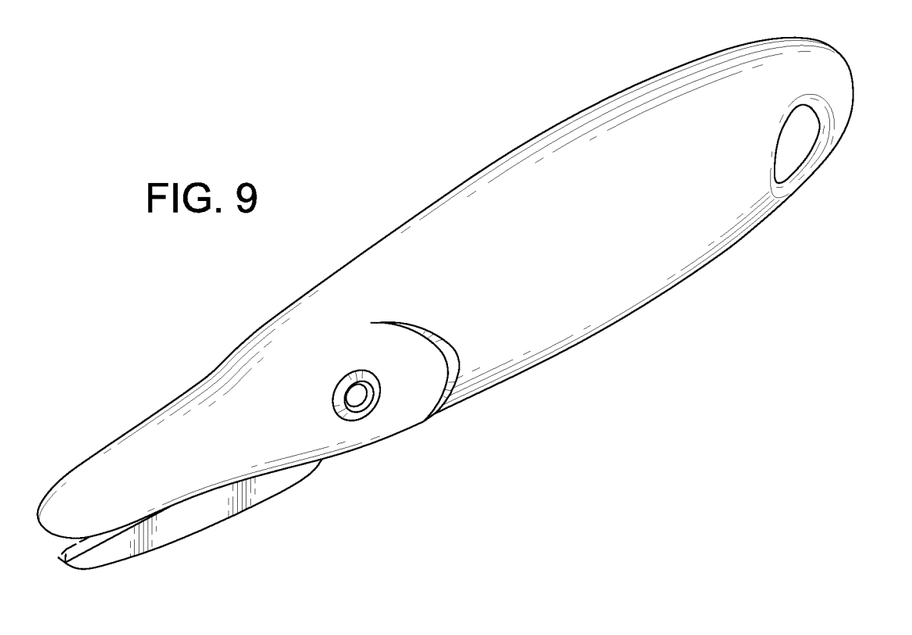
FIG. 9 is a perspective upper left side view of an example seafood sheller according to an embodiment of the present disclosure.
Figure 10:
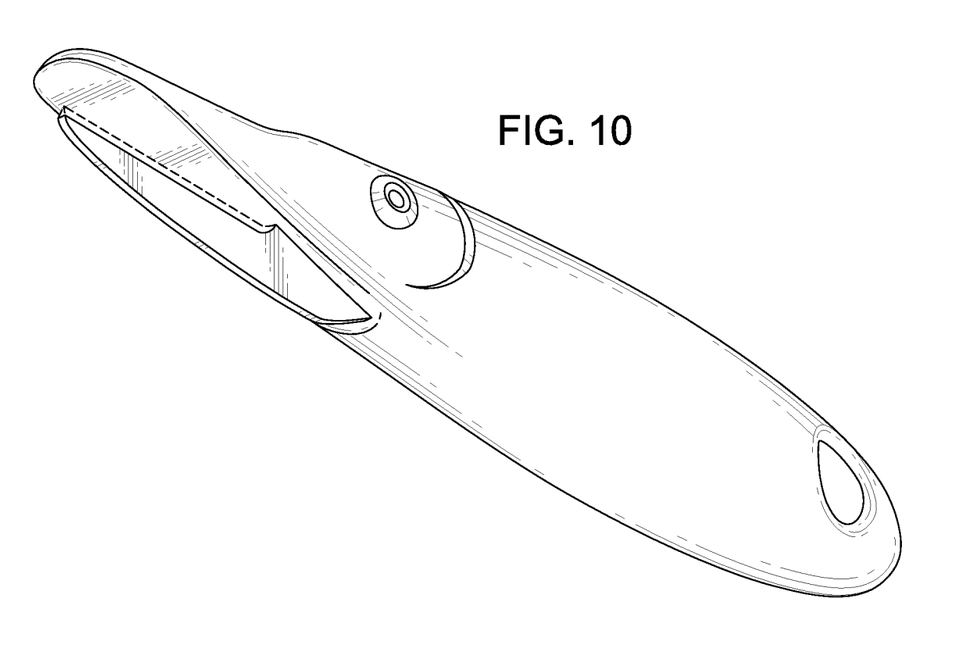
FIG. 10 is a perspective lower left side view thereof.
Figure 11:
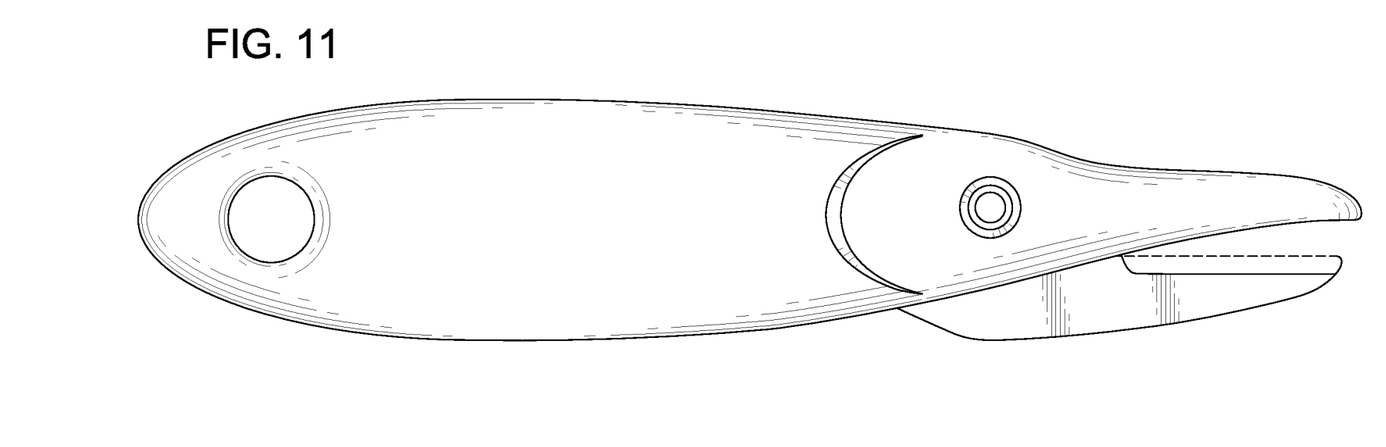
FIG. 11 is a right-side elevation view thereof.
Figure 12:
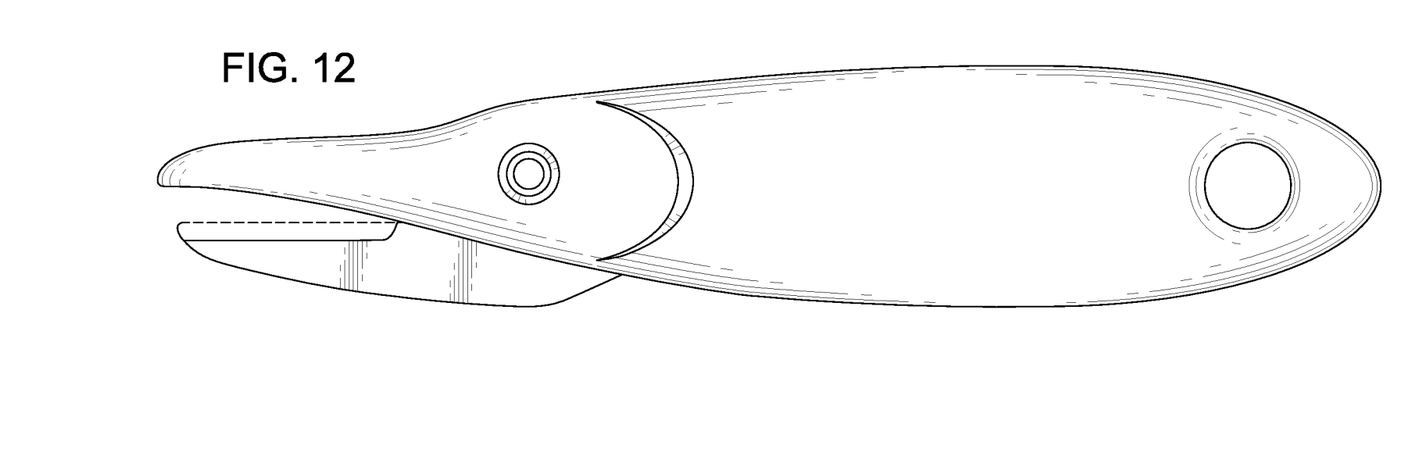
FIG. 12 is a left side elevation view thereof.
Figure 13:
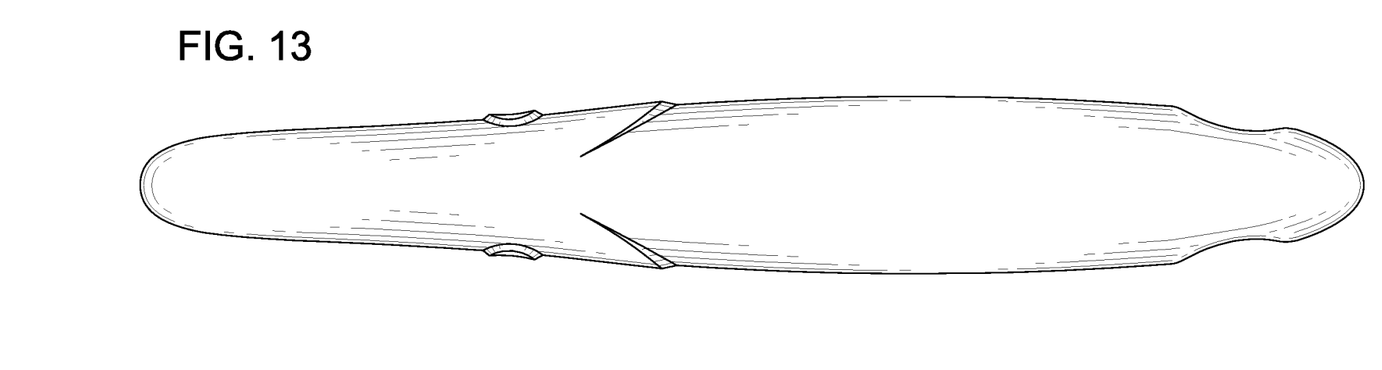
FIG. 13 is a top plan view thereof.
Figure 14:
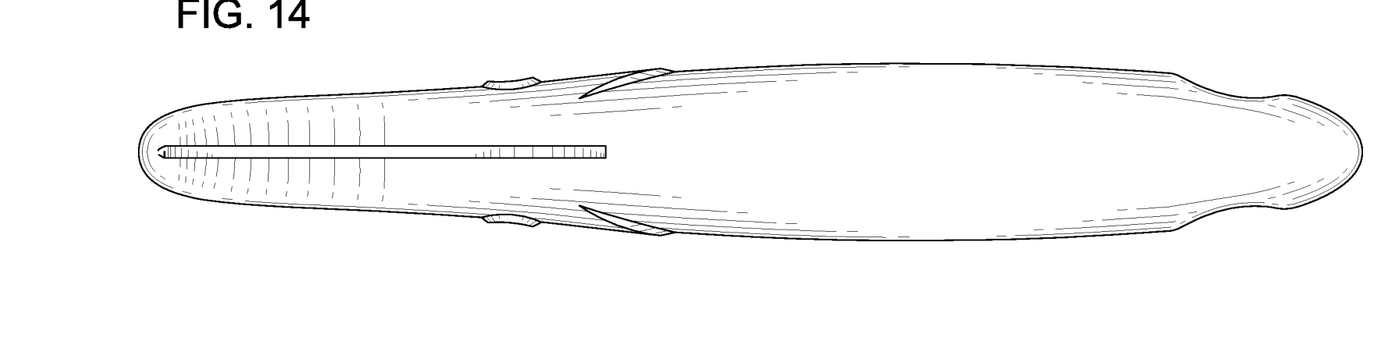
FIG. 14 is a bottom plan view thereof.
Figure 15:
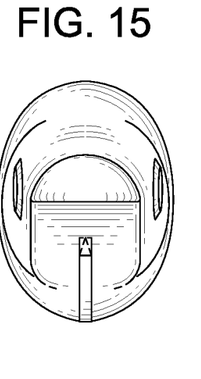
FIG. 15 is a front side elevation view thereof.
Figure 16:
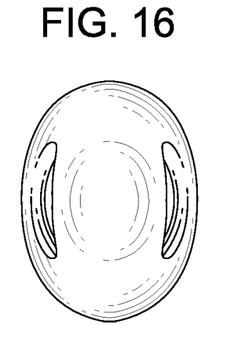
FIG. 16 is a back-side elevation view thereof.

In some embodiments, the handle member 12 and the upper beak member 14 may be formed from the same unitary material such as a plastic or a composite, and the lower blade member 16 insert-molded in place in seafood sheller 10, as well as in seafood sheller 110 illustrated in, for example, FIGS. 6-8. In other embodiments, however, these components may be formed from separate components and/or multiple materials. In some embodiments the lower blade member 16 may be formed from a metal, an alloy, a composite, or the like.

Figure 2:
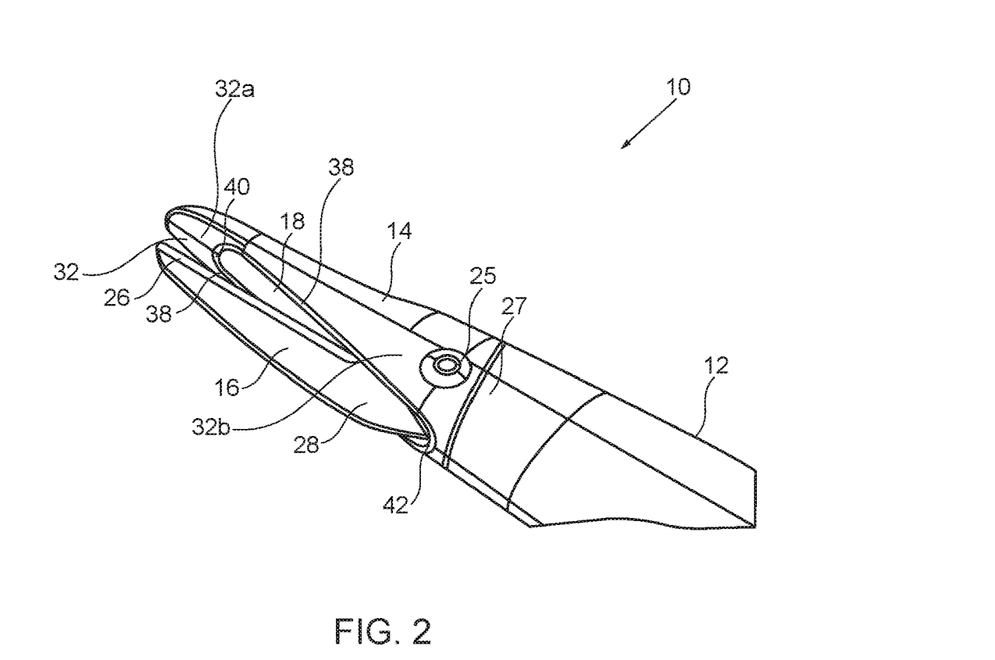
FIG. 2 is a bottom side perspective view of the distal portion of the example seafood sheller of FIG. 1A.

In various embodiments, the channel 18 may be a partial or otherwise semi-cylindrical channel as shown, for example, in FIG. 1B, and in FIG. 2, which is a bottom side perspective view of the distal portion of the seafood sheller 10. As illustrated in FIGS. 1A and 1B, the lower blade member 16 may be mounted in alignment to a center line of the channel 18. In particular, the lower blade member 16 includes on the distal topside of the lower blade member 16 a blade edge 26 and on the proximal topside of the lower blade member 16 a blade base 28 as illustrated, for example, in FIG. 2. In some embodiments, the blade edge 26 may be a straight blade edge, as illustrated in FIG. 2, while in other embodiments, the blade edge 26 may be a saw or serrated blade. The blade base 28 may be mounted into the proximal end of the channel 18 (e.g., the side of the channel 18 nearest to the handle member 12).

In various embodiments, one or more rails 38 may be disposed along the peripheral edges of the channel 18. Note that in FIG. 2, a single rail 38 encircles the channel 18. However, and as one of ordinary skill in the art will recognize, the channel 18 may be encircled or at least surrounded on both longitudinal sides of the channel 18 by at least two non-continuous rails 38. For these embodiments, the one or more rails 38 may define at least the longitudinal borders of the channel 18. In some embodiments, the one or more rails 38 may be one or more slight protrusions that protrudes from the upper beak member bottom 32 that are sloped rearwardly downward relative to the blade edge 26 (e.g., relative to a blade edge line 36 defined by the blade edge 26).

The upper beak member bottom 32 includes a forward portion 32a and a rearward portion 32b. In some embodiments, the lower blade member 16 may comprise a thin or slender blade that may include serrated or straight edge and that may have a length of about, for example, one to two inches long (e.g., 2.54 to 5.08 cm), with its blade edge 26 running substantially parallel to a longitudinal axis 30 of the handle member. In various embodiments, the lateral width $W_1$ or thickness of at least the portion of the lower blade member 16 that includes the blade edge 26 and the blade base 28 is smaller than the lateral width $W_2$ of the channel 18 (e.g., the distance between the two rails 38 on either side of the channel 18).

Figure 1C:
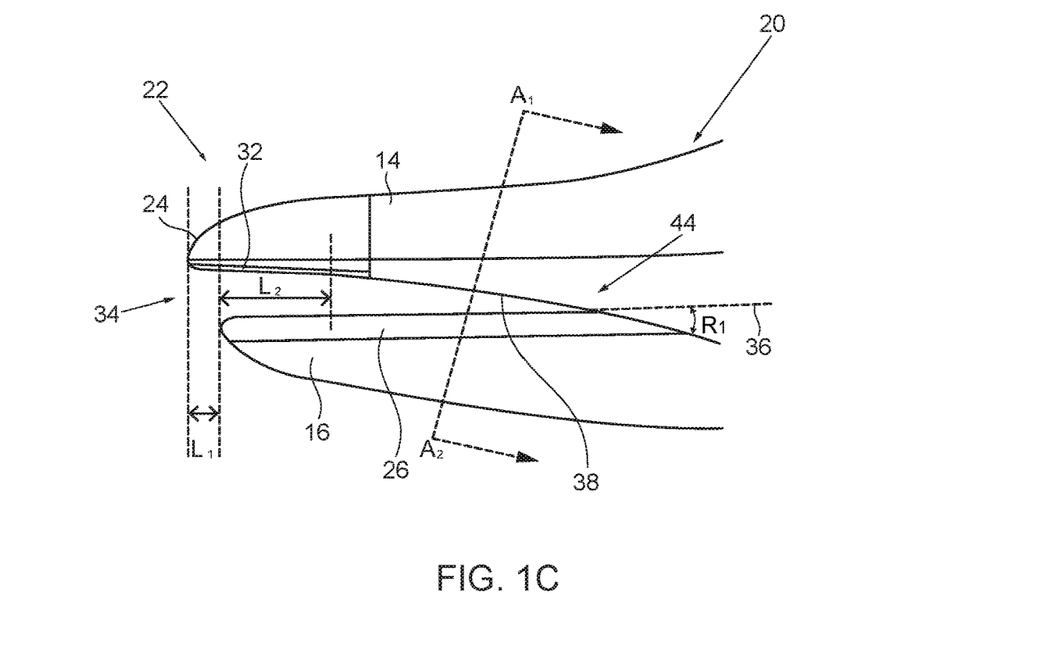
FIG. 1C is a closeup side elevation view of distal portion of the example seafood sheller of FIG. 1A.

FIG. 1C is a closeup view of the distal portion of the seafood sheller 10 including the distal side 22 of the upper beak member 14 and the lower blade member 16 according to some embodiments. In various embodiments, the upper beak member 14 may include a beak end 24 that may have a blunt external surface (not sharp in comparison with the blade edge 26). In some embodiments, the beak end 24 may have a lateral width of about $¼^{th}$ inch (6.35 mm) to about $⅜^{th}$ inch (9.525 mm) at its widest and longitudinally extends by $L_1$ beyond an end of the lower blade member 16 as illustrated in FIG. 1C. In some embodiments, $L_1$ may be from about $⅛^{th}$ to about $¼^{th}$ inch (e.g., from about 3.18 to about 6.35 mm). For example, in one embodiment, $L_1$ may be about $⅛^{th}$ inch (e.g., 3.18 mm). In some embodiments, a forward portion of the upper beak member bottom 32 as shown in FIG. 1C, may be generally parallel with the blade edge 26 of the lower blade member 16, and may be from about $⅛^{th}$ to about $¼^{th}$ (e.g., from about 3.18 to about 6.35 mm) above the blade edge 26 of the lower blade member 16, thus creating an open mouth 34, which in some cases may be about $⅛^{th}$ inch (3.18 mm) wide. That is, in some cases, the vertical width of at least a portion of the mouth 34 (e.g., vertical distance between the forward portion of the upper beak member bottom 16 and distal portion of the blade edge 26) may be about $⅛^{th}$ inch. For example, in one embodiment, the distal or forward portion 32a of the upper beak member bottom 32 may be about $⅛^{th}$ inch (3.18 mm) above the forward portion of the blade edge 26. Thus, in various embodiments, the gap between upper beak member bottom 32 and the blade edge 26 of the lower blade member 16 may partly define the mouth 34, where the mouth 34 may be vertically widest in FIG. 1C at the distal side 22 of the upper beak member, and narrows towards the proximal side 20 of the upper beak member 14. As also illustrated, the mouth 34 is partly defined by the upper beak member bottom 32 and the blade edge 26 and narrows in the rearwardly direction towards the throat of the mouth 34 (e.g., rear of proximal end of the mouth 34).

Referring to FIG. 2, which is a perspective view of the distal section of the seafood sheller 10. As noted above, each side (e.g., peripheral edges) of the channel 18 is defined by one or more rails 38 that extends downwards in FIG. 2, with a forward or distal boundary of the channel 18 defined by one or more rails 38 on longitudinal sides of the elongated channel 18 joining at point 40 forward of the channel 18, and with a rearward boundary of the channel 18 defined by the rails 38 on either side of the channel 18 joining at point 42 rearward of the channel 18.

Figure 3:
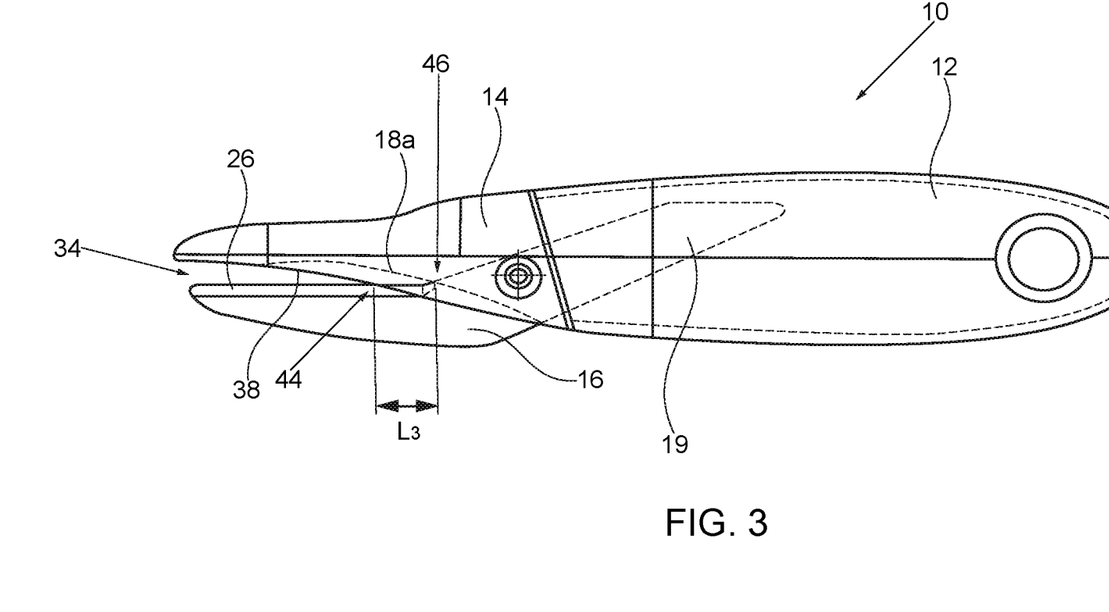
FIG. 3 is a cross-sectional elevation view of the example seafood sheller of FIG. 1A.

Referring now to FIG. 3, which is a side elevation cross-sectional view of the seafood sheller 10. From a forward end portion of the seafood sheller 10 and moving longitudinally rearward towards the "throat" or "head" of the mouth 34, the rails 38 (FIG. 3 shows one rail 38) slope rearwardly downwards in a downward angle relative to, for example, a horizontal line (e.g., blade edge line 36) that is defined by the blade edge 26 (note that embodiments where the blade edge 26 is a serrated or saw tooth edge, the line that is defined by the blade edge 26, may be defined by the peaks or valleys of the saw tooth edge). FIG. 1C shows the downward angle of rails 38 as being $R_1$ (note that in various embodiments $R_1$ may represent the downward angle of the upper beak member bottom 32 relative to the blade edge line 36—see FIG. 1C), which in some embodiments may be between from about 15° to about 25° degrees. For example, in one embodiment, $R_1$ may be approximately 20° degrees. In FIG. 3, the rails 38 slope downwards towards and past the blade edge 26, and drops below the blade edge 26 at a cross over point 44, which in some cases may be about ¼ inch (e.g., 6.35 mm) forward of the point 46 (see FIG. 3) where the blade edge 26 connects to the proximal end of the channel bottom 18a in some embodiments. That is, at the cross over point 44, the blade edge 26 may continue to extend at least partially into the semi-cylindrical channel 18 and into the channel bottom 18a as illustrated in FIG. 3. In various embodiments, the cross over point 44 may be a location where the rails 38 crosses past blade edge line 36 defined by the blade edge 26.

In some embodiments, and without limitation, the interior space defined by the inner surface of the semi-cylindrical channel 18 may be approximately ¼ inch (e.g., 6.35 mm) wide at its widest point and $\frac{1}{8}^{th}$ inch (e.g., 3.18 mm) deep at its deepest point. The outer or peripheral edges of the channel 18, which may form one or more rails 38 on both of the longitudinal sides of the channel 18 (e.g., in FIG. 2, a rail 38 that encircles channel 18 is disposed on both of the longitudinal sides of the channel 18), may be around ¼ inch (e.g., 6.35 mm) laterally apart in some embodiments and may intersect/cross below the blade edge 26 at the cross over point 44 to form the "throat" and that terminates below and behind the lower blade member 16. As will be further discussed herein, the narrowing of the mouth 34 into a throat at cross over point 44 ensures that any shell that is inserted deep into the mouth 34 may be secured at the cross over point 44 when a user is using the seafood sheller 10 to split open the shell. In order to ensure that the throat can capture and secure a piece of shell, in some embodiments the $R_1$ angle (see FIG. 1C) should not be greater than, for example, 25° degrees, and preferably around 20° degrees in one implementation.

Disposed on opposite side surfaces 27 of seafood sheller 10 are raised surface features (hereinafter "gripping features") designed to guide and secure the user's proper grip on the seafood sheller 25 (see, for example, FIGS. 1A, and 1B) that in some embodiments may have circular or other shapes. The gripping features 25 may protrude from the opposite side surfaces 27 that may be used by users to firmly grip the seafood sheller 10. For example, when a user is using the seafood sheller 10 to split open a crab shell, the user may hold the seafood sheller 10 by placing his or her thumb and fore-finger into the center of the gripping features 25 and wrapping the other fingers of the user's gripping hand around the bottom of the seafood sheller permitting the user to firmly grip the seafood sheller 10. In various embodiments, the gripping features 25 may be placed rearwardly from the throat of the mouth 34. For example, the gripping features 25 may be placed about ½ inch (e.g., 12.7 mm) rearwardly from the cross over point 44 in some embodiments. The placement of the gripping features 25 on the side surfaces 27 helps users to firmly grip the seafood sheller 10, and to guide a user to grip the seafood sheller 10 in the proper manner (e.g., a user may use the gripping features 25 to guide where to place his or her thumb on the seafood sheller 10, increasing the likelihood that the user will grip the seafood sheller 10 in the proper manner). In some embodiments, the gripping features 25 may be the ends of a cross-pin used to stabilize and secure the lower blade member 16 to the handle member 12. Alternatively, the griping features 25 may be portions of the surfaces 27 that protrudes outward from the side surfaces 27 and that may be in the shape of, for example, circular grooves.

In various embodiments, the lower blade member 16 may be mounted parallel or substantially parallel to the longitudinal axis 30 (see FIG. 1A) of the handle member 12 such that it emerges through the center of the channel 18 (at the channel's deepest point or points). In some embodiments, the bottom center of the channel 18, may be $\frac{1}{8}^{th}$ inch (e.g., 3.18 mm) above a lowest portion of the rails 38 (relative to the perspective of the seafood sheller 10 illustrated in FIG. 1A). In other words, the depth of the channel 18 at its deepest point and relative to the rails 38 may be about $\frac{1}{8}^{th}$ inch (e.g., 3.18 mm) for these embodiments.

In various embodiments, the combination of the downward slant portion of the rails 38 of the upper beak member 14 relative to the blade edge 26 as illustrated, for example, in FIG. 1C, the positioning of the blade edge 26 between the rails 38 and the existence of the cross over point 44, with the blade edge 26 continuing to extend about ¼ inch (e.g., 6.35 mm) deeper into the channel 18 beyond the cross over point 44 ensures that a shell that is inserted into the cross over point 44 is securely held by the seafood sheller 10 during operational use as previously alluded.

Figure 4:
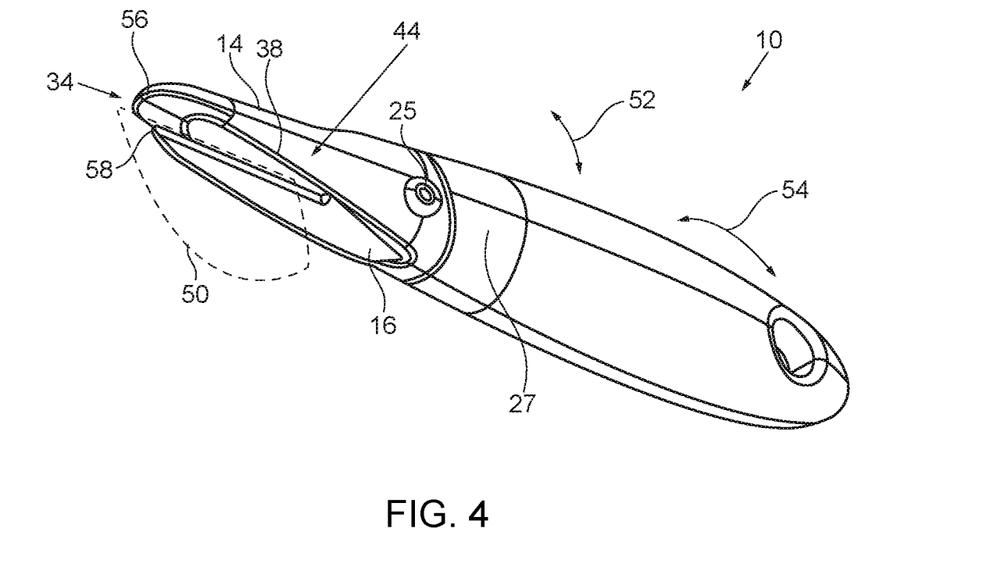
FIG. 4 is a bottom side perspective view of the example seafood sheller of FIG. 1A along with an outline of a shell.

Referring to FIG. 4, which illustrates another perspective view of the seafood sheller 10 and an outline of a shell 50 inserted deep into throat of the mouth 34. By inserting the shell 50 deep into the throat of the mouth 34, the shell 50 is secured at the cross over point 44 (see also FIGS. 1C and 3 that provide a better perspective of cross over point 44) where the rail 38 crosses down past the blade edge 26. As a result, the shell 50 is trapped between the wider upper beak member bottom 32 and the blade edge 26 at the cross over point 44, as illustrated in FIG. 4.

When used to split or crack open an outer shell 50 of a crustacean, the user may grip the handle member 12 and insert the lower blade member 16 underneath the shell 50, and drive the seafood sheller 10 forward until the shell 50 is securely held by the seafood sheller 10 at the cross over point 44. As the shell 50 is driven towards the throat of the mouth 34, the downwardly angled rails 38 and channel 18 may cause the shell 50 to bend into the channel 18 that may facilitate the splitting or cracking of the shell 50. Once secured, the user, in order to crack open the shell 50, may either cycle (e.g., repeatedly move) the seafood sheller 10 up and down as it is advanced forward, as represented by arrows 52 using the distal end 56 of the upper beak member 14 as a fulcrum point against the outside of the shell as the handle is lifted, turning the seafood sheller 10 with a twisting motion as represented by arrows 54, or a combination of both up and down and twisting motions in order to crack open the shell 50.

In the following, examples are provided of how the seafood sheller 10 may be used on a shell of a crab, in order to crack or cut through the shell of the crab leg. In various embodiments, the user may firmly grip the seafood sheller 10 with one hand and hold the crab leg with the other hand. As the user holds the crab leg with one hand, the user may push and drive into the crab leg the seafood sheller 10 such that the edge of the crab leg shell is forced into the mouth 34 and toward the throat of the seafood sheller 10 between the blade edge 26 and rails 38. Note that in various embodiments, when the user pushes and drives the seafood sheller 10 into the crab leg shell, the lower blade member 16 is shoved underneath the shell. As the seafood sheller 10 is driven forward (and/or as the crab leg shell is shoved deep into the mouth 34) the user may additionally twist the handle member 12 back and forth, in order to get the shell of the crab leg to crack or cut open. That is, as the distal end 58 of the lower blade member 16 is driven forward into the shell 50, the blade edge 26 runs along the inside of the shell 50, and the shell 50 is forced downward against the blade edge 26 as the outer surface of the shell 50 abuts against the angled rails 38 (as well as against the concave curved interior surface of the channel 18). Continued insertion of the shell 50 into the throat of the mouth 34 may start a crack in the edge of the shell 50 as the shell's outer surface bares against the angled rails 38, which in some embodiments are separated by ¼ inch (e.g., 6.35 mm), and is forced below the plane of the blade edge 26 by being pushed into the throat region of the mouth 34.

In some embodiments, to continue the process of cracking open the shell 50, after an initial crack has been started, the lower blade member 16 may be withdrawn about halfway (e.g., the outer edge of the shell 50 is retracted halfway out of the mouth 34) and the handle member 12 may be lifted. In so doing, the tip of the beak end 24 (see FIG. 1A) may push down and pivot against the outside of the shell 50 as the edge of the lower blade member 16 is pulled up to propagate the crack from the inside out and separate the shell 50. Because the pivot point at the tip of the beak (i.e., beak end 24 in FIG. 1A) extends forward of the distal end 58 of the lower blade member 16, the lower blade member 16 passes up through the shell 50 as the handle member 12 is lifted without damaging the meat inside. The fact that the distance between the point where the beak end 24 contacts the outer surface of the shell 50 and the point where the lower blade member 16 (or more particularly, the distal end 58 of the lower blade member 16) engages the inside of the shell 50 in some embodiment may only be about ½ inch (e.g., 12.7 mm), while the handle member 12 in this embodiment may be about 6 inches long (or longer or shorter in other embodiments), creates a powerful lever advantage that makes the seafood sheller very easy to use.

As noted above, in various embodiments and without limitation, the blunt beak end 24 of the upper beak member 14 may extend $⅛^{th}$ inch (e.g., 3.18 mm) beyond the distal end 58 of the lower blade member 16, and the vertical gap (e.g., vertical gap of the opening of the mouth 34) between the front part of the beak end 24 and the distal end 58 of the lower blade member 16 may also be around $⅛^{th}$ inch. Because the blunt beak end 24 in this embodiment extends $⅛^{th}$ inch (e.g., 3.18 mm) beyond the end of the lower blade member 16 and the vertical gap between the front part of the beak end 24 and the distal end 58 of the lower blade member 16 may only be $⅛^{th}$ inch (e.g., 3.18 mm), the user is protected from being stabbed in the opposing hand if the user loses control and the lower blade member 16 slips out of, for example, the shell of a crab leg as the seafood sheller 10 is being pushed into the crab shell.

In some cases, some shorter, thicker, irregularly shaped parts of a crab shell, such as the short joint sections on the leg with the claw and the "rings" that remain on the body after the legs are removed, may not be inserted far enough into the throat of the mouth 34 to be cracked by pushing the blade edge 26 into the section. Nor can they be cracked by lifting the handle member 12 to pull the lower blade member 16 up through the shell because the section is too short for the tip of the beak to have a place on the outside of the shell to provide a fulcrum. To extract meat from such sections, these sections may be jammed as far as they can go into the throat of the seafood sheller 10 so that the shell is locked between the blade edge 26 and the rails 38. A crack can then be started and propagated by simply twisting the handle member 12 back and forth (as represented by ref 54 in FIG. 4) and pushing the seafood sheller 10 to separate the shell from the meat.

By using the seafood sheller 10 on opposing sides of each section of, for example, a crab shell, and applying whatever combination of forces is necessary, the seafood sheller 10 may split the shell of the section into two pieces, allowing the meat to be removed from the section intact.

Note that the shells of crustaceans, and crabs in particular, have a multitude of different contours and thicknesses, each requiring a different means to apply cracking force to separate them. The unique configuration of the seafood sheller 10 allows it to function as a one-piece multi-tool for shelling/cracking crab of all types, as well as other types of crustaceans such as lobsters. The seafood sheller 10 can safely crack the shell of a crustacean from the inside out, and in a quick, clean, and easy manner.

Figure 5:
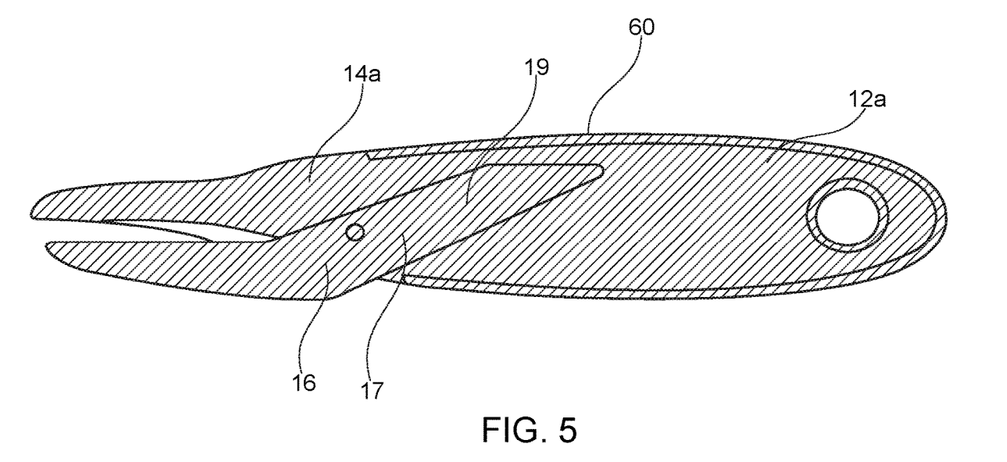
FIG. 5 illustrates two of three components needed to assemble a seafood sheller according to various embodiments.

As noted above, the seafood sheller 10 may be simple to manufacture using various approaches. For example, one approach is to employ an insert molding process where plastic may be molded around, for example, the lower blade member 16 to form a unitary body that includes both the upper beak member 14 and the handle member 12 of the seafood sheller 10. Alternatively, a unitary body that includes the upper beak member 14 and a handle member 12 may be formed in two halves, then the base of the lower blade member 16 may be placed between the two halves before the three components are glued, fused, or the like together to form the seafood sheller 10. For example, in FIG. 5, two of the three components that may be needed to form the seafood sheller 10 using this technique are illustrated. More particularly, FIG. 5 illustrates a lower blade member 16 with its blade mount portion 19 disposed on top of a main body segment 60. The main body segment 60 represents half of a unitary body that comprises of a handle member 12 and an upper beak member 14 of a seafood sheller 10. That is the main body segment 60 includes a handle member segment 12a and an upper beak member segment 14a that when the main body segment 60 is fused or glued together with a second main body segment (not depicted) that mirrors the first main body segment 60 (with the lower blade member 16 disposed between the two main body segments) forms a seafood sheller 10. The handle member segment 12a and the upper beak member segment 14a of the main body segment 60, along with the corresponding handle member segment and the upper beak member of the second main body segment (not depicted), forms the handle member 12 and the upper beak member 14 of the resulting seafood sheller 10.

Note that in some embodiments, and as illustrated in FIGS. 3 and 5, the lower blade member 16 may be integrally formed with a blade mount portion 19 having a perimeter edge that may extend rearward away from the blade edge 26, but may also extend upwardly, at a rearwardly upward slope, such that the blade mount 19 may extend upward into the handle member 12 for stable mounting purposes as shown, for example, in FIGS. 3 and 5.

Referring now to FIGS. 6, 7, and 8, which illustrate another example seafood sheller 110 according to various embodiments. The seafood sheller 110 includes substantially the same components included in the seafood sheller 10 illustrated in FIGS. 1A-5. For example, the seafood sheller 110 includes a handle member 112, an upper beak member 114 that longitudinally extends from the handle member 112, and a lower blade member 116 that may be molded into an upper beak member bottom 132 via a blade base 128. The seafood sheller 110 includes two protruding features on opposite side surfaces of the seafood sheller 110 including, gripping features 125 (similar or same as the previously described gripping features 25) and raised guiding features 162 (note only one set of the gripping feature 125 and raised guiding feature 162 is visible in FIGS. 6-8) specifically placed on the side surfaces of the seafood sheller 110 to guide and secure the user's grip, and a through hole 113. Note that the raised guiding feature 162 is located rearward of the gripping feature 125 that is disposed on the same side surface.

The only differences between the seafood sheller 110 of FIGS. 6-8 and the previously illustrated and described seafood sheller 10 of FIGS. 1A-5 is that the seafood sheller 110 does not have a channel 18 disposed in the upper beak member bottom 132 and the seafood sheller 110 employs a serrated or saw-tooth blade 126 (not that in alternative embodiments, the seafood sheller 110 may employ a straight edge blade similar to the one illustrated in FIGS. 1A and 2). The upper beak member bottom 132 includes a forward portion 132*a* and a rearward portion 132*b*, where the blade base 128 of the lower blade member 116 mounted into the rearward portion 132*b* of the upper beak member bottom 132 (in some cases the blade base 128 may be molded into the rearward portion 132*b* of the upper beak member bottom 132). As illustrated in FIG. 8, the rearward portion 132*b* of the upper beak member bottom 132 may have a plane curve shape (e.g., semi-circular or arced shape) that flattens out towards the forward portion 132*a*, which may be substantially flat or planar.

Referring particularly now to FIG. 7, which is a closeup side elevation view of distal portion of the example seafood sheller 110 of FIG. 6. Note that at least the portion of the upper beak member bottom 132 nearest to the handle member 112 and that intersects the blade base 128 may have a downward angle $R_1$, relative to a blade edge line 136 defined by the blade edge 126. As noted above, the downward angle $R_1$ in some embodiments may be between from about 15° to about 25° degrees. For example, in one embodiment, $R_1$ may be approximately 20° degrees. Similar to the seafood sheller 10 of FIGS. 1A-5, the seafood sheller 110 of FIGS. 6-8 includes a distal end 156 of the upper beak member 114 that extends beyond the distal end 158 of the lower blade member 116, the same as or similar to the seafood sheller 10 of FIGS. 1A-5.

FIGS. 9-16 illustrate different views of an example seafood sheller according to various embodiments of the present disclosure.

Various embodiments in this disclosure are described in the context of opening the shells of crustaceans. However, as will be understood by those skilled in the art after reviewing this disclosure, the embodiments may be suitable for use in other environments (e.g., in the context of cutting or crack opening hard covering of edible or non-edible items), and may be modified in the spirit of this disclosure to accommodate those environments.

The various embodiments described herein, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the disclosure. Reference throughout this specification to "various embodiments," "one embodiment," "an embodiment," "additional embodiment(s)", "alternative embodiments," or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A seafood sheller comprising:
a handle member;
an upper beak member extending longitudinally forward from the handle member and having a distal end opposite from the handle member and an upper beak member bottom that extends longitudinally from the handle member; and
a lower blade member with a blade edge and a blade base, the blade edge extending longitudinally forward beneath the upper beak member bottom from the blade base, the blade base being connected to the upper beak member at a rearward portion of the upper beak member bottom, the lower blade member having a distal end opposite from the blade base, the distal end of the upper beak member longitudinally extending forwardly beyond the distal end of the lower blade member;
wherein vertical distance between forward portion of the upper beak member bottom and distal portion of the blade edge is $\frac{1}{8}^{th}$ inch.

2. The seafood sheller of claim 1, wherein the bottom of the upper beak member and the blade edge of the lower blade member defining at least a portion of a mouth, and at least one gripping feature disposed on at least one side surface of the handle member, the at least one gripping feature disposed rearward of the mouth.

3. The seafood sheller of claim 1, wherein the upper beak member is tapered to narrow as it extends forward from the handle member.

4. The seafood sheller of claim 1, wherein the distal end of the upper beak member extends forwardly beyond the distal end of the lower blade member by $\frac{1}{8}^{th}$ to $\frac{1}{4}^{th}$ inches.

5. The seafood sheller of claim 1, wherein rearward portion of the upper beak member bottom having a plane curve shape that flattens out towards forward portion of the upper beak member bottom.

6. The seafood sheller of claim 1, wherein the blade edge defines a blade edge line and portion of the upper beak member bottom that intersect the blade base having a downward angle relative to the blade edge line between 15° and 25° degrees.

7. The seafood sheller of claim 1, wherein the blade edge is serrated.

8. The seafood sheller of claim 1 further comprising a blade mount portion integrally formed as part of the lower blade member comprising the blade edge and the blade base, the blade mount portion rearward of the blade base and extending vertically upward into the handle member to stabilize the blade relative to the handle member.

9. The seafood sheller of claim 1, wherein the upper beak member includes one or more rails disposed on the upper beak member bottom, with the one or more rails at least defining longitudinal borders of a channel that longitudinally extends along the upper beak member bottom.

10. The seafood sheller of claim 9, wherein the one or more rails are sloped rearwardly downward, relative to the blade edge.

11. The seafood sheller of claim 10, wherein the one or more rails are sloped rearwardly downward, at aa downward slope of 20° degrees, relative to the blade edge defining a horizontal line.

12. The seafood sheller of claim 9, wherein a location at which the downward sloping one or more rails cross past a blade edge line defined by the blade edge is ¼ inch forward of a point where the blade base connects to the upper beak member at a location within rearward portion of the channel.

13. A seafood sheller comprising:
   a handle member;
   an upper beak member extending longitudinally forward from the handle member and having a distal end opposite from the handle member and an upper beak member bottom that extends longitudinally from the handle member; and
   a lower blade member with a blade edge and a blade base, the blade edge extending longitudinally forward beneath the upper beak member bottom from the blade base, the blade base being connected to the upper beak member at a rearward portion of the upper beak member bottom, the lower blade member having a distal end opposite from the blade base, the distal end of the upper beak member longitudinally extending forwardly beyond the distal end of the lower blade member;
   wherein the upper beak member includes one or more rails disposed on the upper beak member bottom, with the one or more rails at least defining longitudinal borders of a channel that longitudinally extends along the upper beak member bottom;
   wherein vertical distance between forward portion of the upper beak member bottom and forward portion of the blade edge is ⅛ inch.

14. The seafood sheller of claim 1, wherein the blade base is connected to the upper beak member at a location within the channel.

* * * * *